US 8,769,695 B2

(12) United States Patent
Richards et al.

(10) Patent No.: US 8,769,695 B2
(45) Date of Patent: Jul. 1, 2014

(54) PHISH PROBABILITY SCORING MODEL

(75) Inventors: Phillip L. Richards, Charlotte, NC (US); Michael J. Mayer, Charlotte, NC (US); David M. Andersen, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 516 days.

(21) Appl. No.: 12/433,398

(22) Filed: Apr. 30, 2009

(65) Prior Publication Data

US 2010/0281536 A1  Nov. 4, 2010

(51) Int. Cl.
*G06F 21/00* (2013.01)

(52) U.S. Cl.
USPC ............................................. 726/25; 726/22

(58) Field of Classification Search
USPC ................................................ 26/22; 726/22
See application file for complete search history.

(56) References Cited

U.S. PATENT DOCUMENTS

| | | | |
|---|---|---|---|
| 6,732,157 B1 | 5/2004 | Gordon et al. | |
| 7,822,620 B2* | 10/2010 | Dixon et al. | 705/1.1 |
| 2006/0080735 A1* | 4/2006 | Brinson et al. | 726/22 |
| 2006/0149821 A1 | 7/2006 | Rajan et al. | |
| 2007/0192855 A1 | 8/2007 | Hulten et al. | |
| 2008/0010683 A1* | 1/2008 | Baddour et al. | 726/24 |
| 2008/0046970 A1 | 2/2008 | Oliver et al. | |
| 2009/0006532 A1 | 1/2009 | Sinn et al. | |
| 2009/0157675 A1* | 6/2009 | Stellhorn et al. | 707/6 |
| 2010/0024037 A1* | 1/2010 | Grzymala-Busse et al. | 726/26 |
| 2010/0058178 A1* | 3/2010 | Dong et al. | 715/256 |

FOREIGN PATENT DOCUMENTS

| | | |
|---|---|---|
| EP | 2 068 514 A1 | 6/2009 |
| WO | WO 2008/037207 A1 | 4/2008 |
| WO | WO 2009/131469 A1 | 10/2009 |

OTHER PUBLICATIONS

GB Search Report dated Aug. 5, 2010 for GB Application No. GB1006978.9.
U.S. Appl. No. 11/957,346, filed Dec. 14, 2007.

* cited by examiner

*Primary Examiner* — Jung Kim
*Assistant Examiner* — Tri Tran
(74) *Attorney, Agent, or Firm* — Michael A. Springs; Moore and Van Allen, PLLC; Patrick B. Home

(57) ABSTRACT

In general, embodiments of the invention relate to systems, methods, and computer program products for determining the probability that a given website is conducting or is related to fraudulent activity, including phishing activity. More particularly, embodiments of the invention relate to automatically monitoring and scoring URLs for fraudulent activity by parsing keywords, combinations of keywords, and other relevant data from an input communication, such as an email, and analyzing the data obtained against a database containing a plurality of grading factors.

20 Claims, 4 Drawing Sheets

PHISH PROBABILITY SCORING MODEL

FIELD

In general, embodiments of the invention relate to systems, methods, and computer program products for determining the probability that a given website is conducting or is related to fraudulent activity, including phishing activity.

BACKGROUND

Fraudulent and deceitful activity has existed since the inception of crime itself, and as society has advanced, so too have the methods used to carry out fraudulent activities. Relatively recently, the internet and electronic mail, known more commonly as "email" or "e-mail," have become staples of the public at large. Fraudulent and deceitful activities have evolved to meet this new niche. An example of one such activity is phishing. At its most basic, phishing is the process of attempting to acquire sensitive user information, such as user names, passwords, or credit card details by masquerading as a trustworthy entity in an electronic communication.

Phishing has become a growing public concern, and unfortunately, the act can take a variety of forms and methods. In one example, a "phisher" can contact an internet user through an email soliciting personal or financial information. The contact email can often resemble a communication from a well-known entity with whom the user has a pre-existing relationship. The fake email can solicit the user to either directly enter sensitive information in a reply email or in some instances to follow a link to a fake website where sensitive information would be requested. This fake website often mirrors the website of the well-known entity the phisher is attempting to resemble. In one example, the soliciting email would appear to be from the user's bank or any other entity with whom the user has an account.

The solicitation itself can be very convincing. Often, the fake email will persuade the user to relay personal information by pretending to be an entity that the user trusts, as previously described. The email will often seek to verify a user's information or fix a purported problem with their account. If the user believes that the email is legitimate and responds to the email, the phisher will essentially be handed whatever information the user can give. Any information the phisher obtains from an unsuspecting user can be used, but most often the phisher will seek social security numbers, checking or deposit account numbers, PIN numbers, passwords, credit card numbers, or any other related piece of information tied to the user.

The emails sent by phishers often appear to be completely legitimate. As a result, it is difficult for individuals to protect themselves from phishers and phishing websites. Corporations, on the other hand, have the resources, including time, money, and man-power, to combat these fraudulent techniques. With the right tools, a corporation could better protect itself and its customers from fraudulent internet based attacks, such as phishing schemes.

SUMMARY

Generally, embodiments of the invention relate to systems, methods, and computer program products for accurately detecting threatening websites, including those websites conducting fraudulent schemes, and in particular, phishing schemes. For example, in one embodiment a computer program product is configured to receive input data, such as an email or a uniform resource locator (more commonly known as "URL"), and to compute a score denoting the probability of fraudulent activity related to the received input data. The computer program product embodiment of the invention is configured to calculate this score by comparing the received input data to stored historical threat data contained on a local database server through a mathematical algorithm. The computer program product embodiment is also configured to update the database with any relevant received input data, thereby making the calculations more efficient in each future iteration. As such, embodiments of the present invention allow an organization to more effectively monitor and stop threatening activity related to the organization.

More particularly, embodiments of the present invention will allow an organization to monitor and stop a plurality of threatening activities being committed against a corporation and/or its client and employee bases. The computer program product comprises a computer readable medium having computer readable program instructions stored therein. Said computer readable program instructions comprise first instructions configured to receive input data. Said computer readable program instructions further comprise second instructions configured to parse the input data into relevant substrings of data and third instructions configured to calculate a score by comparing the relevant substrings of data against data from a database server history, said score denoting the likelihood of threatening activity being related to the input data source.

In one embodiment, a system is provided that comprises: a processor for execution of a threat detection application for determining the probability that a website link is associated with fraudulent activity; a communication device associated with the processor for receiving a website link; and a database associated with the processor. The database comprises: a plurality of different keyword combinations that have been identified in previously received website links; and, for each of the different keyword combination, a total number of instances a website link containing the respective keyword combination has been received by the system and a number of instances a website link containing the respective keyword combination was associated with fraudulent activity. The threat detection application executed by the processor is configured to: review each website link received by the system to identify which of the keyword combinations is included in the website link; and calculate a threat score for each website link based the total number of instances a website link containing the same keyword combination has been received by the system and the number of instances a website link containing the same keyword combination was associated with fraudulent activity. The threat score is the probability that a website link is associated with fraudulent activity. It should be appreciated that the keyword combination comprises only one keyword or that the keyword combination comprises more than one keyword.

It should be appreciated that the database could be organized into a table having a plurality of lines, wherein each of the different keyword combinations is assigned to one of the lines and wherein each line comprises: a plurality of data points, wherein each data point represents one of the keywords of the particular keyword combination assigned to the line, wherein the individual data points, which each represent one keyword, combine represent the keyword combination assigned to the line; the total number of instances a website link containing the keyword combination assigned to the line has been received by the system; and number of instances a website link containing the keyword combination assigned to the line was associated with fraudulent activity. If a received website link includes a keyword combination that does not match any of the keyword combinations assigned to the lines in the table, the threat detection application executed by the processor is configured to combine multiple lines of the table so as to create a keyword combination that matches the keyword combination of the received website link. In some embodiments, the threat detection application executed by the processor is further configured to: aggregate the number of instances the keyword combinations of each of the combined lines have been identified in previously received website links; and aggregate the number of instances the keyword combinations of each of the combined lines have been identified in previously reported website links that are associated with fraudulent activity. The threat detection application executed by the processor may be further configured to: calculate the threat score by determining the ratio of the aggregated number of instances the keyword combinations of the combined lines have been reported and aggregate the number of instances the keyword combinations of each of the combined lines have been identified in previously reported website links that are associated with fraudulent activity.

According to some embodiments a method is provided. The method comprises storing in a database the following information: a plurality of different keyword combinations that have been identified in previously received website links; and for each of the different keyword combination, a total number of instances a website link containing the respective keyword combination has been received by the system and a number of instances a website link containing the respective keyword combination was associated with fraudulent activity. The method further comprises using a processor to access the database and execute a threat detection application for determining the probability that a website link is associated with fraudulent activity. The threat detection application executed by the processor is configured to: review each website link received by the system to identify which of the keyword combinations is included in the website link; and calculate a threat score for each website link based the total number of instances a website link containing the same keyword combination has been received by the system and the number of instances a website link containing the same keyword combination was associated with fraudulent activity.

According to some embodiments, a computer program product is provided for determining the probability that a website link is associated with fraudulent activity. The computer program product comprising a computer-readable medium having computer-executable instructions embodied therein. The computer-executable instructions comprise: first instructions configured to store in a database a plurality of different keyword combinations that have been identified in previously received website links; second instructions configured to store in the database, for each of the different keyword combinations, a total number of instances a website link containing the respective keyword combination has been received by the system and a number of instances a website link containing the respective keyword combination was associated with fraudulent activity; third instructions configured to receive from a client device a website link in question; fourth instructions configured to identify which of the keyword combinations is included in the website link in question; and fifth instructions configured to determine the probability that the website link in question is associated with fraudulent activity by dividing the total number of instances a website link has been stored in the database having the same keyword combination identified in the website link in question by the number of instances a website link has been stored in the database having the same keyword combination and being associated with fraudulent activity.

BRIEF DESCRIPTION OF THE DRAWINGS

Figure 1:
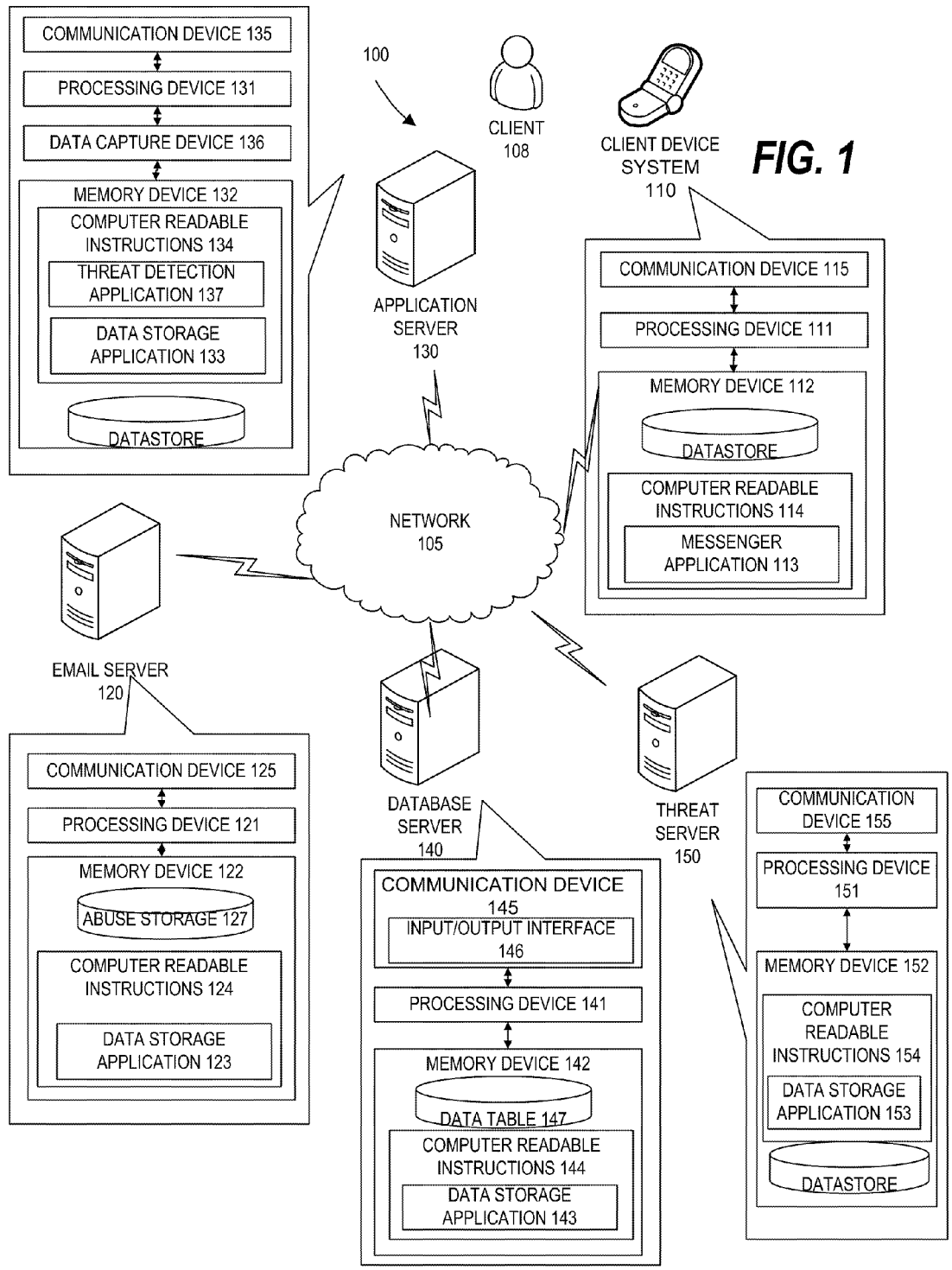
Figure 2:
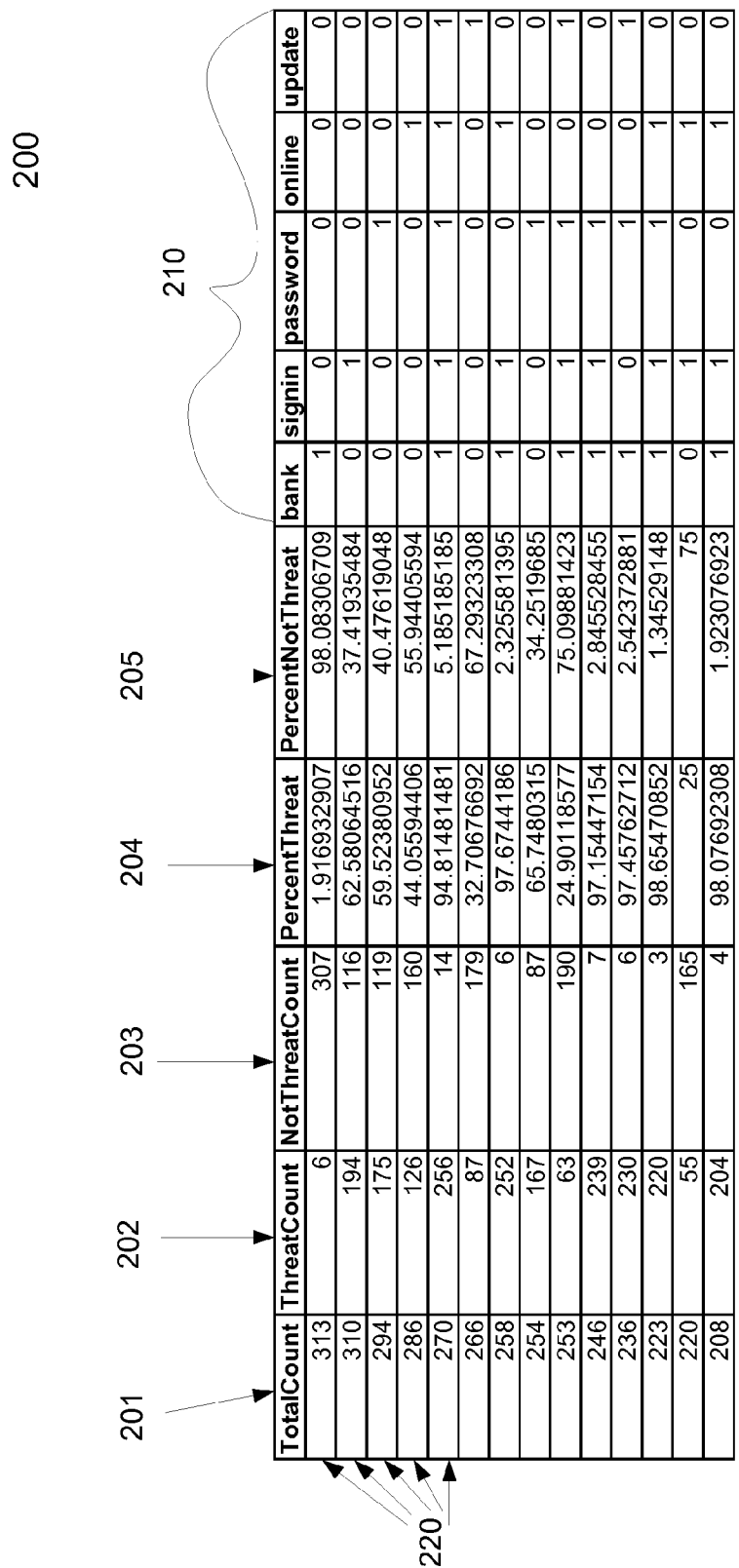
Figure 3:
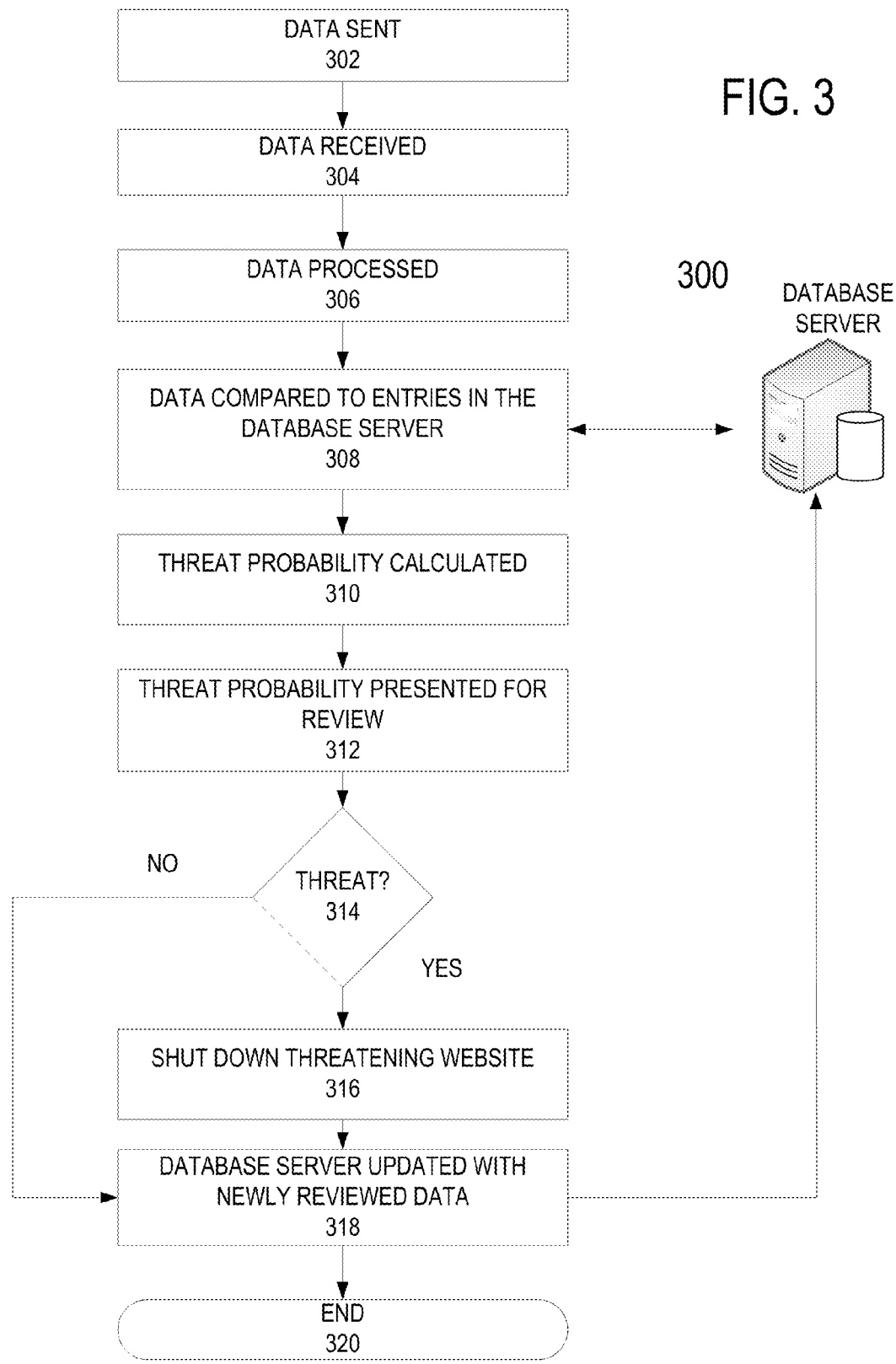
Figure 4:
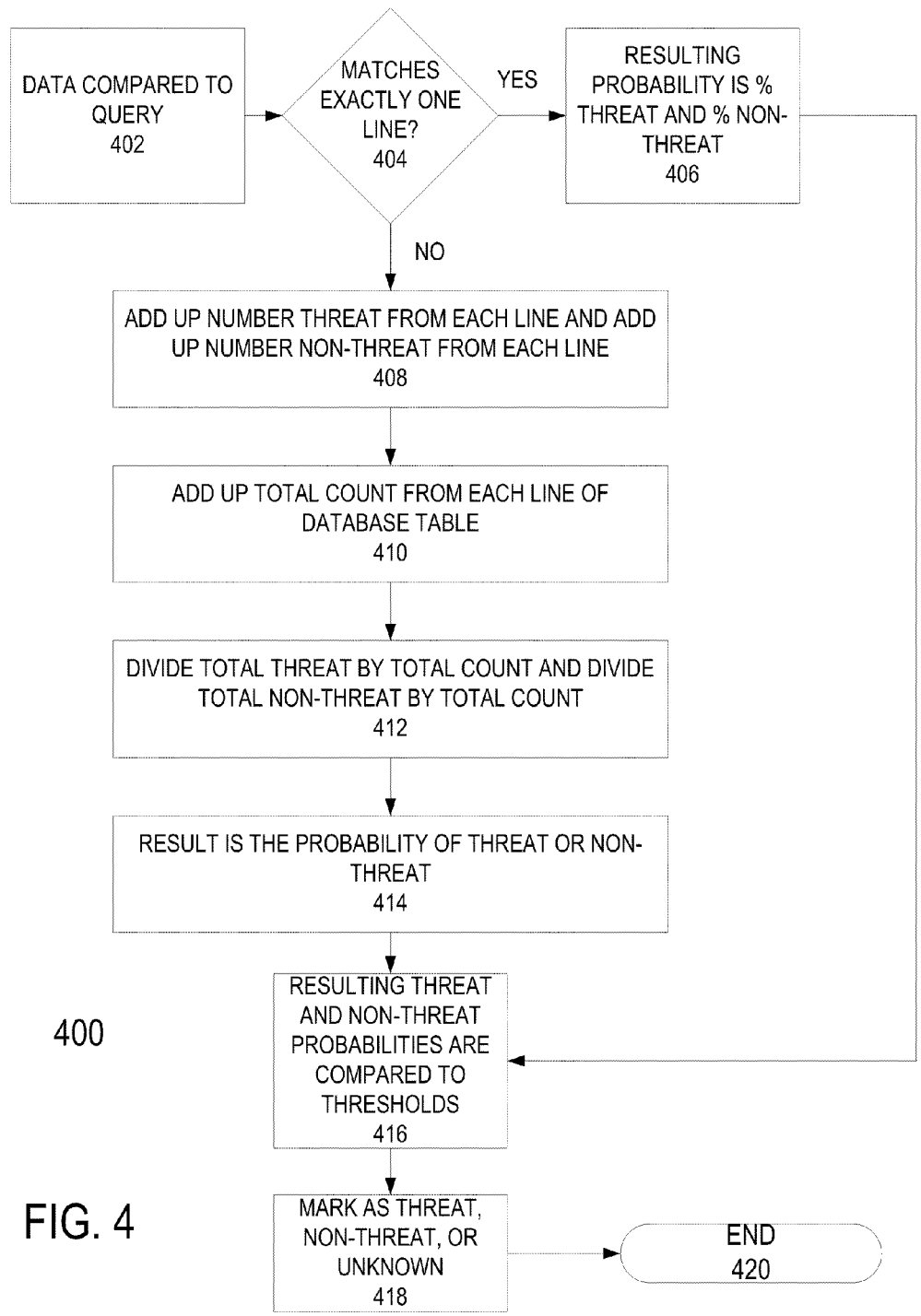

Having thus described embodiments of the invention in general terms, reference will now be made to the accompanying drawings, wherein:

FIG. 1 is a functional block diagram illustrating an environment for practicing the invention;

FIG. 2 is a table diagram generally illustrating one embodiment of the data table used to determine the probability that a given website is threatening;

FIG. 3 is a flow diagram generally illustrating one embodiment for an application process of determining the probability that a given website is threatening; and FIG. 4 is a flow diagram illustrating one embodiment for an application process of calculating a threat probability score.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art, the present invention may be embodied as a method (including a business process), system, computer program product, or a combination of the foregoing. Accordingly, the present invention may take the form of an entirely hardware embodiment, an entirely software embodiment (including firmware, resident software, micro-code, etc.), or an embodiment combining software and hardware aspects that may generally be referred to herein as a "system." Furthermore, the present invention may take the form of a computer program product on a computer-readable medium having computer-usable program code embodied in the medium.

Any suitable computer usable or computer readable medium may be utilized. The computer usable or computer readable medium may be, for example but not limited to, an electronic, magnetic, optical, electromagnetic, infrared, or semiconductor system, apparatus, device, or propagation medium. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device; or transmission media such as those supporting the Internet or an intranet. Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer usable or computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described below with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block(s).

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As described above, it is important to be able to detect and stop threatening internet activities, such as fraudulent schemes and more particularly, phishing schemes. To that end, various aspects of the systems and methods described herein are directed toward detecting threatening websites, including those involved in fraudulent activities. In some embodiments, automated protocols are provided for analyzing incoming data to determine which sites are likely threatening or malicious.

In general, many of the examples found herein, are directed toward a particular implementation wherein data related to a website in question is collected from various sources and analyzed against previously collected data to calculate the probability that the website in question is threatening. The calculated probability can then be used to determine what, if any, action should be taken against the website. For example, websites having a low-threat probability are cleared of suspicion, websites having a moderate-threat probability are assigned to a hand grader for further evaluation, and websites having a high-threat probability are shut down using an automatic shut down protocol. It should be appreciated that, after the threat probability is calculated, actions—other than or in addition to those mentioned above—could be taken to determine whether the website is indeed threatening and, if so, to neutralize such a threat.

Turning to FIG. 1, there is shown a simplified block diagram illustrating an exemplary operating environment 100 in which the invention may be implemented. The operating environment 100 is only one example of a suitable operating environment and is not intended to suggest any limitation as to the scope of use or functionality of the present invention. Thus, other well known environments and configurations may be employed without departing from the scope or spirit of the present invention.

As shown in FIG. 1, a network 105 interconnects the client device system 110, the email server 120, the application server 130, the database server 140, and the threat server 150. The client device system 110 can be in communication with any of the email server 120, the application server 130, the database server 140, or the threat server 150 through network 105. The email server 120, the application server 130, the database server 140, and the threat server 150 may also be in communication with each other through network 105.

The operating environment 100 described above operates in a networked environment using logical connections to one or more remote computers, such as a personal computer, a server, a router, a network personal computer, or any other peer device. The remote computer will typically include most, if not all, of the elements described above in relation to the computer useable or readable medium. The logical connections could include a local area network (LAN), a wide area network (WAN), or any other network, such as the Internet, intranets, or other common office network environments.

The client device system 110 may include any computing device capable of receiving and sending a message over a network, such as network 105, to or from another computing device. The set of client devices may include devices that are usually considered general purpose computing devices and typically connect to a network using a wired communications medium at one or more fixed locations such as personal computers, laptop computers, multiprocessor systems, microprocessor-based or programmable consumer electronics, network PCs, and the like. However, the set of such devices may also include more specialized mobile devices with limited capabilities and typically connect using a wireless communications medium such as cell phones, smart phones, pagers, radio frequency devices, infrared devices, CBs, integrated devices combining one or more of the preceding devices, or virtually any mobile device, and the like. Similarly, the client device systems 110 may include any device that is capable of connecting using a wired or wireless communication medium such as a personal digital assistant (PDA), POCKET PC, wearable computer, and any other device that is equipped to communicate over a wired and/or wireless communication medium.

The client device system 110 generally include a communication device 115, a processing device 111, and a memory device 112 wherein the processing device 111 is operatively coupled to the communication device 115 and the memory device 112. As used herein, the term "processing device" generally includes circuitry used for implementing the communication and/or logic functions of a particular system. For example, a processing device 111 may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device 111 may include functionality to operate one or more software programs based on computer-readable instructions thereof, which may be stored in the memory device 112.

The processing device 111 uses the communication device 115 to communicate with the network 105, and other devices on the network 105, including but not limited to the email server 120, the application server 130, and the threat server 150. As such, the communication device 115 generally comprises a modem, server, or other device for communicating with other devices on the network 105, and a display, mouse, keyboard, microphone, and/or speakers for communicating with one or more users.

The client device system 110 may further include a messenger application 113 that allows a user to perform myriad operations. For example, the messenger application 113 is operable to send a message to, or receive a message from, another computing device. Similar messenger applications can include, but are not limited to, Short Message Service (SMS), Multimedia Messaging Service (MMS), Instant Messaging (IM), Internet Relay Chat (IRC), Jabber, email, or any other similar communication mechanism.

Although FIG. 1 illustrates the client device system 110 as one system, it should be noted that there can be one or multiple systems with one or multiple applications, each with similar components that handle a number of functions related to client activity or other client systems. It is also important to note that each of the multiple systems can be in communication with each other through the network 105 and in communication with any of the email server 120, the application server 130, the threat server 150, or any other device connected to network 105.

The application server 130 generally includes a communication device 135, a processing device 131, and a memory device 132. The processing device 131 is operatively coupled to the communication device 135 and the memory device 132. The processing device 131 uses the communication device 135 to communicate with other devices on the network 105, including but not limited to the client device system 110, the email server 120, the database server 140, and the threat server 150. As such, the communication device 135 generally comprises a modem, server, or other device for communicating with other devices on the network 105.

As further illustrated by FIG. 1, the application server 130 contains computer-readable program instructions stored in the memory device 132, which includes the computer-readable instructions of a data storage application 133 and a threat detection application 137. The data storage application 133 is used to store data, such as email text, URLs, hypertext markup language (HTML), or virtually any other information transferable over the network 105. The stored data may be captured from the email server 120, the database server 140, the threat server 150, or any type of client device systems 110. As discussed in more detail below, the threat detection application 137 is used to produce a threat score based on information stored in the memory device 132 and information obtained from the database server 140. The threat score represents the probability that a given data piece is related to threatening internet activity, including fraudulent schemes.

The email server 120 generally includes a communication device 125, a processing device 121, and a memory device 122. The processing device 121 is operatively coupled to the communication device 125 and the memory device 122. The processing device 121 uses the communication device 125 to communicate with other devices on the network 105, including but not limited to, the application server 130, the threat server 150, and the client device system 110. As such, the communication device 125 generally comprises a modem, server, or other devices for communicating with other devices on the network 105.

The email server 120 further includes computer-readable program instructions stored in the memory device 122, which includes the computer-readable instructions of a data storage application 123. The data storage application 123 is used to store data captured from any of the communication methods recognized by the communication device 125, including email, IM, or any similar apparatus, in a secure location for later access. The email server 120 also includes the abuse storage 127. The abuse storage 127 is primarily set up to receive and store information sent directly from the client system 110. The abuse storage 127 is, however, also set up as a dummy email account used to seek out and receive email from the threat server 150 described below. In this case, the abuse storage 127 is set up by an operational environment administrator. The administrator creates the fake email account to receive email from a multitude of sources in hopes of receiving threatening data from the threat server 150.

The database server 140 generally includes a communication device 145, a processing device 141, and a memory device 142. The processing device 141 is operatively coupled to the communication device 145 and the memory device 142. The processing device 141 uses the communication device 145 to communicate with other devices on the network 105, including but not limited to, the application server 130. As such, the communication device 145 generally comprises a modem, server, or other device for communicating with other devices on the network 105.

Additionally, the communication device 145 contains an input/output interface 146. The input/output interface 146 governs input and output devices relating to the database server 140. A user may enter commands and information into the database server 140 through input devices such as a tablet, or electronic digitizer, a microphone, a keyboard, a pointing device, commonly known as a mouse, trackball, or touch pad, or the like. The database server 140 may also communicate with the user as the input/output interface 146 enables the use of output devices such as, but not limited to, a display monitor, speakers, a printer, or the like.

The database server 140 further contains computer-readable program instructions stored in the memory device 142, which includes the computer-readable instructions of a data storage application 143. The data storage application 143 is used to store data captured from any of the communication methods recognized by the communication device 145, including email, IM, or any similar apparatus, in a secure location for later access or in the alternative, capture data entered by a user through input/output interface 146.

The data storage application 143 retains data of a variety of types, including data representing the threat history of numerous websites which can be found in the data table 147. The data table 147, like the data storage application 143, is located in the memory device 142. The threat history is data tending to show the threatening nature (or lack thereof) relative to each keyword group. Initially, the data table 147 is comprised entirely of hand entered data gleaned from past website threat evaluation. This gleaned data represents a threat history and is generally composed of the number of instances of detected threatening activity or nonthreatening activity combined with a log of the keyword group related to the detection. For example, this data may include the number of instances where customers have reported URLs having a particular keyword or keyword group and the number of instances where the customer-reported URL actually linked to a threatening website. In one embodiment, the data storage application 143 also contains data representing threat score thresholds. These thresholds are used during the evaluation process to measure the likelihood of the presence of a threatening website.

According to one embodiment, the data table 147 is arranged in matrix form wherein the available web information is broken into a finite number of keywords selected to represent the terms most likely indicating a threat. Each row of the data table 147 includes data representing a specific keyword combination of the available keywords as well as the corresponding threat history and threat score relating to the distinct keyword combination.

FIG. 2 represents one possible embodiment of the data table 147 as the example table 200. As previously described, the example table 200 is arranged as a matrix. The columns of the matrix are composed of simple variables and the keywords 210. In this embodiment, the simple variables consist of the total count 201, the threat count 202, the non-threat count 203, the threat score 204 and the non-threat score 205. The keywords 210 consist of five distinct words tending to indicate threatening activity, although it would be obvious to one of ordinary skill that any number of keywords could be used. The keywords 210 in this example include the terms "bank," "signin," "password," "online," and "update." The rows 220 represent a particular keyword combination and its relative combination history data. Within the rows 220, the presence or absence of the keywords 210 are marked as either a "1" or a "0". If a particular term is present, then its location is marked with a "1" within the example table 200. If, however, a particular term is absent, then the location is marked as a "0" in the example table 200. It should be noted that all of the information found in the example table 200 relates to the tendency of particular data to show threatening activity within the threat server 150 described in FIG. 1.

The data table 147 not only provides data that indicates the threat history of a given keyword or keyword combination, but it also constantly updates with current data. After the keyword group has been produced from the original data, the group can be analyzed and a threat determination made as described below. After the determination has been made, the keyword group information produced from the previously mentioned analysis is entered into the data table 147, including the threat history. The corresponding threat score is updated to reflect the additional threat history information. The threat score indicates the number of times the particular keyword group has been associated with a threatening webpage as compared to the total number of times the keyword group has been analyzed. As a particular keyword group occurs more frequently, the data in data table 147 will represent more accurate data history and will carry more weight as a higher frequency of occurrence tends to allow for greater statistical significance and reliability. It is also important to note that although data table 147 has been illustrated as one table, it should be noted that there can be one or multiple tables, each with similar design and data retention functions.

The threat server 150 is not a part of the claimed invention, but is connected to the network 105 nonetheless. The threat server 150 as connected to operational environment 100 is operated by an unknown entity. The threat server 150 represents the location and origin of an example threatening website, involved in fraudulent activity, and more specifically, conducting a phishing scheme.

The threat server 150 generally includes a communication device 155, a processing device 151, and a memory device 152. The processing device 151 is operatively coupled to the communication device 151 and the memory device 152. The processing device 151 uses the communication device 155 to communicate with other devices on the network 105, including but not limited to, the client device systems 110 and the email server 120. As such, the communication device 155 generally comprises a modem, server, or other device for communicating with other devices on the network 105.

In addition, the threat server 150 includes network computing devices configured to provide various resources, including content and services, over the network 105. More specifically, the threat server 150 represents a server that could be configured to provide faulty, misleading, and/or fraudulent information. In one embodiment, threat server 150 represents a suspected phishing website. In such an embodiment, threat server 150 could provide at least some phishing content in the form of services or content that on the surface appears legitimate.

Typically, the threat server 150 could include an interface wherein the interface requests confidential or sensitive information from a user of the client device systems 110. In one embodiment, the threat server 150 could provide a user of the client device system 110 access to a seemingly legitimate website that asks the user to provide any of a variety of information, including but not limited to, log-in information, credit card number, social security number, medical information, or any other type of sensitive data. Further, the client device system 110 may be provided with network links to the threat server 150 by way of various communication systems which can include email, IM, another server, or even other client devices.

Devices that may operate as the threat server 150 include, but are not limited to, personal computers, desktop computers, multiprocessor systems, microprocessor-based or programmable consumer electronics, network PCs, servers, or any similar device. Further, while a single threat server 150 is depicted, it is apparent to one of ordinary skill that either a single threat server 150 or multiple threat servers may communicate over network 105 at the same time. It is also apparent that many other legitimate devices may communicate with the client device systems 110 over network 105.

The operation of certain aspects of the invention will now be described with reference to FIGS. 2-4. In FIG. 3, a general flow diagram is provided for illustrating a process of detecting threatening websites. More specifically, the process 300 represents a simplified process for determining the probability that a given website is committing threatening activity. Further, the process 300 of FIG. 3 can, for example, be implemented within the operating environment described in FIG. 1.

The process 300 of FIG. 3 begins at block 302 where data is sent to the email server 120 or the application server 130 via the network 105. In general data may be sent from any of the other sources connected to the network 105, including but not limited to, the client device system 110. In the event data is sent from the client device system 110, the data is sent by a client 108 of the client device system 110 based on individual discretion. The client 108 will make this determination after having received a suspicious email or other data piece from the threat server 150. For example, a client 108 may receive an email containing a URL which the client 108, using his own discretion, deems to be potentially threatening. In this case, the client 108 may forward the threatening email to the abuse storage 127. It would be apparent to one of ordinary skill in the art, however, that data may be sent from various other locals able to connect to network 105. In an alternative embodiment, data will be sent directly from the threat server 150 to the abuse storage 127. In these instances, the threat server 150 seeks to induce the client 108 to interact with it, in an attempt to cull data from the client 108.

Block 302 allows for nearly any type of data to be sent. In general, the data will be of the type directly relating to web pages. Data may be sent in the form of an email, or the like. In one embodiment, the client 108 will send data in the form of a URL. It is apparent, however, that the data may include source code, origin ISP, pictures, digital signatures, SSL certificate signatures, proper protocols, or any other relevant piece of data of this kind.

As discussed above, in most instances, data will be sent from client device system 110 based on client discretion. In the embodiments where data is sent or entered directly to the application server 130, client discretion is also utilized. In each of these situations, the client 108 will likely have become suspicious of a particular URL, information request, or other web related data. Such determination may be made based on a variety of factors available to the client 108, including, but not limited to, a misspelling within the webpage, improper grammar, suspect graphics, questions, or the like. In addition, client device system 110 are arranged to communicate with local client sources. Such local client sources include, but are not limited to, operating system components, anti-virus applications, browser components, client firewall components, or the like. Such sources may be configured to provide notice indicating that a particular URL is potentially dangerous. The danger may be indicated by notification that the URL is being blocked or other like notification.

After the client 108 determines that a given piece of information is potentially dangerous, in one embodiment, the client 108 will send data via the client device system 110 to the email server 120 according to block 302. The user may simply send data that the client 108 has determined to be dangerous, or forward the information gathered by the local client sources. As described above, client device systems 110 are arranged to collect URL information from local client sources. The sources may collect data concerning a blocked URL, a specific time that the blocking occurred, a source of a message associated with the URL, a network address of the URL, information about whether the URL is associated with a received email message, a received text message, or is located within a webpage, or the like.

The process flow 300 then proceeds to block 304 where the data potentially indicating that the website may be fraudulent is received. In one embodiment of the invention, data is received by the abuse storage 127 in the form of an email from the client device system 110. It is apparent, however, that data can be received from any source compatible with network 105. It is also apparent that the data received can be of any type, including but not limited to, email text, URL, source code, origin ISP, pictures, digital signatures, SSL certificate, proper protocols, data collected by the local client sources, or the like. It is also apparent that data can be received in a variety of methods including, but not limited to, email, universal serial bus (USB), direct entry by the client 108, or the like, and may be received by the email server 120, the application server 130, or any similar location. The abuse storage 127 is also actively involved at process block 304 in that the abuse storage 127 acts as a fake email account and is configured to solicit and receive email from the threat server 150 as described above.

The process 300 then proceeds to block 306 where the data is processed. Processing the potentially threatening data may take place in many variations. In this step, data received into the system is transformed into data which can be utilized by the threat detection application 137. For example, in one embodiment, the data received in block 302 may be processed by the threat detection application 137 wherein the data received initially as a URL is parsed into data more compatible with the calculation system, which is described below. The URL would first be separated into text strings. These text strings are then compared to existing keywords found in the data table 147, such as the keywords 210 of the example table 200. Based on this comparison, the text strings are arranged as a keyword group corresponding to the matching keywords found in the data table 147. The keyword group represents data relating to the webpage behind the received URL. In addition, the threat detection application 137 will arrange the keyword group in such a way as to make comparison to the matrix-style data tables 147 possible.

The process 300 then proceeds to block 308 where the processed data is compared to entries in data tables 147. In block 308, the keyword group generated in block 306 is individually compared to keyword combination entries in the data tables 147. For each keyword combination, the threat detection application 137 records the similarity, or lack thereof, between a given table entry and keyword group, making the threat calculation possible.

This analysis will now be described with respect to the example table 200 from FIG. 2. After data has been received and stored, the present invention, according to this exemplary embodiment, uses the threat detection application 137 to calculate a threat score based on a modified Bayesian algorithm, utilizing a comparison between the processed data and the example table 200. Using the example table 200, an example will now be provided to illustrate a method of threat score calculation. In this example, the processed data is in the form of a keyword group consisting of elements "bank," "signin," and "online" which are designated as members of the keywords 210. The rows 220 of the example table 200 contain various combinations of the keywords 210, each placed in a distinct row. The threat detection application 137 will analyze each of the rows to find a keyword combination wherein the elements "bank," "signin," and "online" are present and the remaining two keywords are absent. In this example, the seventh data row exactly matches this keyword combination. In this row of the example table 200, the terms "bank," "signin," and "online" are present while the terms "password" and "update" are absent. Once this row is located, the threat detection application 137 produces the threat score 204 and the non-threat score 206 from the row representing the sought-after keyword combination. In row seven, the threat score is about 97.67% and the non-threat score is about 2.33%.

Returning to FIG. 3, the process 300 then moves to block 310 where a threat grade is calculated by the threat detection application 137, as is described more completely below with reference to FIG. 4. Once the potentially threatening data that was processed by the threat detection application 137 has been compared to the data table 147, an algorithm is utilized to calculate the threat grade, which represents the probability that the website or activity in question is threatening or fraudulent. The probability algorithm described herein is based, at least in part, on the rules of Bayesian statistics and probability. According to Bayesian probability calculus, the probability of a hypothesis given the data is proportional to the product of the likelihood times the prior probability. The likelihood encapsulates the effect of the data, while the prior probability specifies the belief in the hypothesis before the data was observed. In short, Bayesian statistics allow a person to calculate the probability of an event occurring given data concerning a prior, related event. In the case of the present invention, Bayesian statistics can be used to calculate the probability that a given website is threatening based on data related to websites that have already been deemed threatening.

The algorithm operates under general rules to calculate the threat score. In one embodiment, the harvested data is compared to the database query. As used herein, the term "query" generally indicates a precise request for information retrieval within the database server 140, and more specifically, the data table 147. If the processed data matches exactly one line of the data table 147, the algorithm simply outputs a resulting threat score and a non-threat score based on the historical data found in the data table 147 relating to the exact match between the keyword group and the keyword combination found in the data table 147. The previously discussed example involving "bank," "signin," and "online" is an example where the processed data matches exactly one line. In this example, the URL, which contains "bank," "signin," and "online," has a threat score of 97.67%, which means that 97.67% of the time this URL is associated with a threatening website. If, on the other hand, the processed data does not match exactly one line in the data table 147, then the process 300 calls for both the number of processed data items consistent with the data table 147 threats and the total overall count to be added from each line, e.g., each column in the data table 147 that matches the processed data. The total threats are then divided by the total count and the resulting threat score is the probability that there exists a viable threat. The same process is completed for non-threat instances, and a similar non-threat score is also generated. If the keyword group does not match exactly one line from the data table 147, the threat detection application 137 will calculate a threat score based on partial matches found within the data table 147.

The process 300 then flows to block 312 where the threat score is presented for review. In one embodiment of the present invention, the threat score is presented for human review. At this point, the human grader can more efficiently review potentially threatening websites because the human grader can review website according to the threat score produced in the previous step. The higher the threat score, the more likely that threatening activity is taking place at the website. The human grader can review the websites in the order of their respective potential threat levels. In another embodiment, human review is unnecessary. If a given threat score is high enough, the system may attempt to shut down the threatening site of its own accord.

After review, a decision is made as to whether the website is a threat in block 314. If the data related to a webpage is determined to be threatening, then an effort may be made to shut down the threatening website as shown in block 316. This effort may entail first sending a cease and desist to the owner of the potentially offending website, although in some instances, the website may be immediately shut down if warranted. If, however, the data points to a given webpage lacking threatening characteristics, then no action is taken against the website.

Regardless of the outcome of review, the process 300 next flows to block 318 where the database server 140 is updated based on the processed data and threat score calculation. The processed data keyword group is added to the existing data tables 147 along with the corresponding threat grade result in order to strengthen the data tables 147 history data. For example, if a keyword group from the processed data is found to be threatening, the data table 147 entry corresponding to the keyword group is updated to reflect that another threat has resulted from this combination. When combined with the perpetually updated database server 140, the probability algorithm is strengthened with each subsequent iteration because the data tables 147 become more accurate as more history data is added. Upon the database server 140 being updated in block 318, the process 300 ends at block 320.

An example of the update procedure will now be more fully described. This example makes reference to the previous example involving FIG. 2, wherein the desired keyword group includes the terms "bank", "signin", and "online." If the keyword group returns a threat score indicating a threat, and the score is verified as a threat at process block 314, then the example table 200 will be updated to reflect the determination. More specifically, the threat history data found in the row containing the desired keyword combination will be updated. In this example, the total count 201 and the threat count 202 values will be increased by one in order to indicate that a new threat of the specific keyword combination has been verified. Once the count totals have been updated, the percent threat 204 and the percent non-threat 205 will be updated based on the updated count totals according the process described below.

FIG. 4 illustrates a flow diagram generally showing one embodiment for the threat score calculation. According to the illustrated embodiment, the process 400 of FIG. 4 is implemented with application server 130 and database server 140 of FIG. 1. Although FIG. 4 outlines a specific method for calculating the threat score, it would be obvious to one of ordinary skill in the art that the threat score could be developed or modified in many different ways.

The process 400 begins in block 402 wherein the keyword group from the processed data is compared to the query. As shown in process block 404, if the keyword group matches exactly one line from the data table 147, then the process 400 flows to block 406 where the threat detection application 137 will locate and output the corresponding threat score and non-threat score as was described above. If, however, the processed data does not match exactly one line from the data tables 147, then the process flows to process block 408 where a threat score is calculated based on the partial matches found between the processed data and the data entries found within data tables 147.

Process block 408 governs the initial step for threat score calculation when the processed data does not match exactly one line from the data table 147. In this step, the threat detection application 137 locates each partial match in the data table 147 and adds up the total number of keywords found to be matching entries in the data table 147 indicating threatening activity. The threat detection application 137 will also add up the number of keywords not matching data entries.

The process then moves to block 410 where the threat detection application 137 adds up the total count of keyword combinations from each line from the data table 147 used for comparison to the keyword group in the previous step. The total count represents the total number of instances a particular keyword combination has been analyzed. In this step, the threat detection application will add the total count from each partial match row to produce a total overall count.

After the number of threats and number of non-threats have been determined from each line used in the analysis, as well as the total count number from each entry in the data table 147 have been determined, the process 400 flows to block 412. In this step, the threat detection application 137, divides the total threat count from the keyword combinations by the total overall count from the data tables 147 entries. The same is also done for the total non-threat count from the keyword combinations and the total count from the data table 147 entries. The division results in a threat score or non-threat score that tends to indicate the likelihood of threatening activity associated with the processed data.

Once division at block 412 has taken place, threat detection application 137 is ready to produce a resulting threat score or non-threat score in block 414 of process 400. In this step, the threat detection application 137 outputs the percentage calculated from the previous step.

After both blocks 406 and 414, where the threat score is produced, the process 400 flows to block 416. In block 416, the resulting threat and non-threat scores are compared to previously determined thresholds. There are both a maximum and a minimum threshold. In one embodiment, the thresholds are Ninety-five percent and Five percent.

Process 400 moves to block 418 after the threshold comparison in block 416. If the resulting threat score is greater than the provided maximum threshold, then the processed data resulting from the initially sent data is marked as threat, whereas if the resulting threat score is less than the provided minimum threshold, the processed data will be marked as a non-threat. The opposite is true for the results covering non-threat scores. If the resulting non-threat score is greater than the provided maximum threshold, then the processed data is marked as a non-threat, while a resulting non-threat score that is less than the provided minimum threshold is marked as a potential threat. If, however, the resulting threat score falls between the two threshold values, then the data will be marked as unknown. In one embodiment, the thresholds are Ninety-five percent and Five percent. In this embodiment, where the resulting threat score is greater than 95% the processed data is marked as threat and those results of less than 5% are marked as non-threat. Those results falling in between the threshold of 95% and 5% are marked as unknown. Once the processed data is marked as threat, non-threat, or unknown, process 400 ends at process block 420.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system comprising:
a processor for execution of a threat detection application for determining the probability that a current website link is associated with fraudulent activity;
a communication device associated with the processor for receiving a website link; and
a database associated with the processor, the database comprising:
a plurality of different keyword combinations that have been identified in previously received website links received at a time prior to a time the current website link was received, where each of the keyword combinations comprises at least two distinct keywords; and
for each of the different keyword combinations, a total count number representing a number of instances a previously received website link, received at a time prior to a time the current website link was received and containing the respective keyword combination, has been received by the system, a threat number representing a number of instances the previously received website link, received at a time prior to a time the current website link was received and containing the respective keyword combination, was associated with fraudulent activity, and a non-threat number representing a number of instances the previously received website link, received at a time prior to a time the current website link was received and not containing the respective keyword combination, was not associated with fraudulent activity;
wherein the threat detection application executed by the processor is configured to:
receive at least one current website link;
review each current website link received by the system to determine that none of the plurality of keyword combinations exactly match words included in the current website link under review;
in response to determining that none of the plurality of the keyword combinations exactly match words included in the current website link, review each previously received website link to identify each of the pluralities of the keyword combinations, from the database, that include at least one keyword that matches at least one word in the current website link, thereby indicating keyword combinations that partially match the current website link;
for each of the keyword combinations that partially matches the current website link, retrieve, from the database, the plurality of threat numbers and/or for each of the keyword combinations that does not match the current website link, retrieve, from the database, and the plurality of non-threat numbers, update the threat numbers and/or the non-threat numbers by an increment of one;
retrieve, from the database, the plurality of total count numbers from each of the different keyword combinations, update the total count numbers by an increment of one;
divide the total threat number by the total count number from each of the different keyword combination, thereby resulting in a probability of threat of the current website link; and/or divide the total non-threat number by the total count number, thereby resulting in a probability of non-threat of the current website link;
compare the probability of threat to a first threshold and/or compare the probability of non-threat to a second threshold; and
based on the comparison, determine that the current website link is a threat if the probability is equaled or greater than the first threshold, non-threat if the probability is equaled or less than the second threshold.

2. The system of claim 1, wherein the keyword combination comprises only one keyword.

3. The system of claim 1, wherein the keyword combination comprises more than one keyword.

4. The system of claim 1, wherein the database is organized into a table having a plurality of lines.

5. The system of claim 4, wherein each of the different keyword combinations is assigned to one of the lines.

6. The system of claim 5, wherein each line comprises:
a plurality of data points, wherein each data point represents one of the keywords of the particular keyword combination assigned to the line, wherein the individual data points, which each represent one keyword, combine represent the keyword combination assigned to the line;

the total number of instances a website link containing the keyword combination assigned to the line has been received by the system; and number of instances a website link containing the keyword combination assigned to the line was associated with fraudulent activity.

7. The system of claim 6, wherein, if a received website link includes a keyword combination that does not match any of the keyword combinations assigned to the lines in the table, the threat detection application executed by the processor is configured to combine multiple lines of the table so as to create a keyword combination that matches the keyword combination of the received website link.

8. The system of claim 7, wherein the threat detection application executed by the processor is further configured to:

aggregate the number of instances the keyword combinations of each of the combined lines have been identified in previously received website links; and aggregate the number of instances the keyword combinations of each of the combined lines have been identified in previously reported website links that are associated with fraudulent activity.

9. The system of claim 8, wherein the threat detection application executed by the processor is further configured to:

calculate the threat score by determining the ratio of the aggregated number of instances the keyword combinations of the combined lines have been reported and aggregate the number of instances the keyword combinations of each of the combined lines have been identified in previously reported website links that are associated with fraudulent activity.

10. The system of claim 1, wherein the threat score is the probability that a website link is associated with fraudulent activity.

11. A method comprising:

storing in a database the following information:

a plurality of different keyword combinations that have been identified in previously received website links; and for each of the different keyword combination, a total number of instances a previously received website link containing the respective keyword combination has been received by the system and a number of instances a previously received website link containing the respective keyword combination was associated with fraudulent activity, where each of the keyword combinations comprises at least two distinct keywords;

using a processor to access the database and execute a threat detection application for determining the probability that a current website link, received at a time after times the previously received website links were received, is associated with fraudulent activity;

for each of the different keyword combinations, a total count number representing a number of instances a previously received website link, received at a time prior to a time the current website link was received and containing the respective keyword combination, has been received by the system, a threat number representing a number of instances a previously received website link, received at a time prior to a time the current website link was received and containing the respective keyword combination, was associated with fraudulent activity, and a non-threat number representing a number of instances a previously received website link, received at a time prior to a time the current website link was received and not containing the respective keyword combination, was not associated with fraudulent activity;

wherein the threat detection application executed by the processor is configured to:

receive at least one current website link;

review each current website link received by the system to determine that none of the plurality of keyword combinations exactly match words included in the current website link under review;

in response to determining that none of the plurality of the keyword combinations exactly match words included in the current website link, review each previously received website link to identify each of the pluralities of the keyword combinations, from the database, that include at least one keyword that matches at least one word in the current website link, thereby indicating keyword combinations that partially match the current website link, for each of the keyword combinations that partially matches the current website link, retrieve, from the database, the plurality of threat numbers and/or for each of the keyword combinations that does not match the current website link, retrieve, from the database, the plurality of non-threat numbers, update the threat numbers and/or the non-threat numbers by an increment of one;

retrieve, from the database, the plurality of total count numbers from each of the different keyword combinations, update the total count numbers by an increment of one;

divide the total threat number by the total count number from each of the different keyword combination, thereby resulting in a probability of threat of the current website link; and/or divide the total non-threat number by the total count number, thereby resulting in a probability of non-threat of the current website link;

compare the probability of threat to a first threshold and/or compare the probability of non-threat to a second threshold; and based on the comparison, determine that the current website link is a threat if the probability is equaled or greater than the first threshold, non-threat if the probability is equaled or less than the second threshold.

12. The method of claim 11, wherein the keyword combination comprises only one keyword.

13. The method of claim 11, wherein the keyword combination comprises more than one keyword.

14. The method of claim 11, further comprising:

organizing the database into a table having a plurality of lines.

15. The method of claim 14, further comprising:

assigning each of the different keyword combinations to one of the lines of the table.

16. The method of claim 15, wherein each line comprises:

a plurality of data points, wherein each data point represents one of the keywords of the particular keyword combination assigned to the line, wherein the individual data points, which each represent one keyword, combine represent the keyword combination assigned to the line;

the total number of instances a website link containing the keyword combination assigned to the line has been received by the system; and number of instances a website link containing the keyword combination assigned to the line was associated with fraudulent activity.

17. The method of claim 16, wherein, if a received website link includes a keyword combination that does not match any of the keyword combinations assigned to the lines in the table, the threat detection application executed by the processor is configured to combine multiple lines of the table so as to create a keyword combination that matches the keyword combination of the received website link.

18. The method of claim 17, wherein the threat detection application executed by the processor is further configured to:
   aggregate the number of instances the keyword combinations of each of the combined lines have been identified in previously received website links; and
   aggregate the number of instances the keyword combinations of each of the combined lines have been identified in previously reported website links that are associated with fraudulent activity.

19. The method of claim 18, wherein the threat detection application executed by the processor is further configured to:
   calculate the threat score by determining the ratio of the aggregated number of instances the keyword combinations of the combined lines have been reported and aggregate the number of instances the keyword combinations of each of the combined lines have been identified in previously reported website links that are associated with fraudulent activity.

20. A computer program product for determining the probability that a current website link is associated with fraudulent activity, the computer program product comprising a non-transient computer-readable medium having computer-executable instructions embodied therein, said computer-executable instructions comprising:
   first instructions configured to store in a database a plurality of different keyword combinations that have been identified in previously received website links where each of the keyword combination comprises at least two distinct keywords;
   second instructions configured to receive from a client device, a current website link in question;
   third instructions configured to review each current website link received by the system to determine whether any of the plurality of keyword combinations exactly match words included in the current website link under review;
   fourth instructions configured to, in response to determining that none of the plurality of the keyword combinations exactly match words included in the current website link, review each previously received website link to identify each of the pluralities of the keyword combinations, from the database, that include at least one keyword that matches at least one word in the current website link, thereby indicating keyword combinations that partially match words included in the current website link, wherein retrieving, from the database, the total count number from each of the different keyword combinations, update the total count number by an increment of one, used the total count number as threat score denominator;
   fifth instructions configured to retrieve from the database, a number of previously received website links that partially match any word in the current website link and that were associated with fraudulent activity to be used as a threat score numerator wherein for each of the keyword combinations that partially matches the current website link, retrieve, from the database, the plurality of threat numbers update the threat numbers by an increment of one;
   sixth instructions configured to determine the probability that the current website link in question is associated with fraudulent activity by dividing the threat score numerator by the threat score denominator.

* * * * *